Oct. 8, 1957
B. WALKER
2,808,892
VEHICLE FUEL TANKS
Filed Dec. 2, 1952
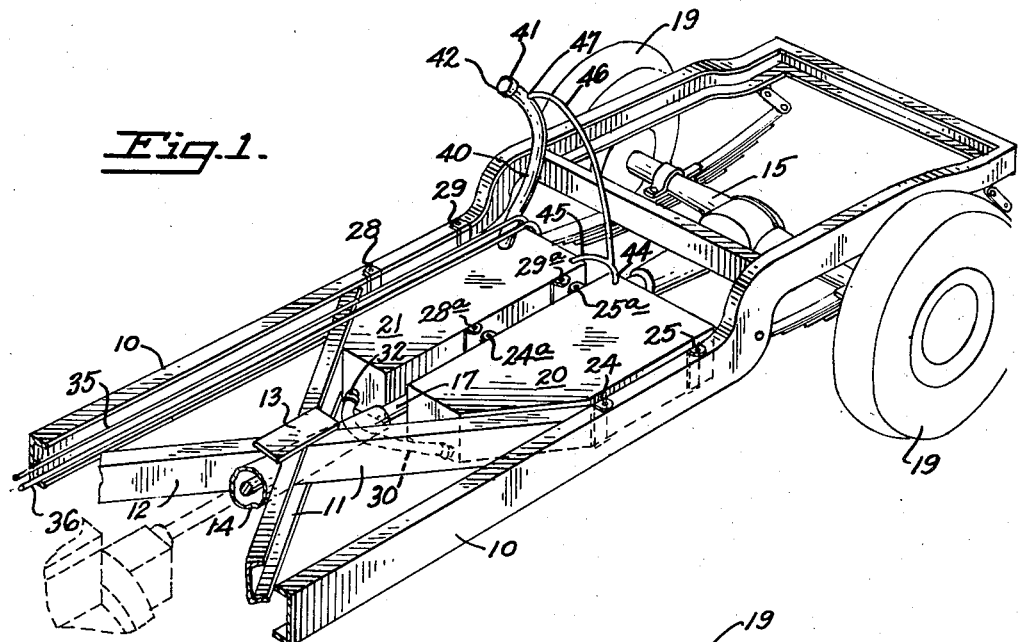
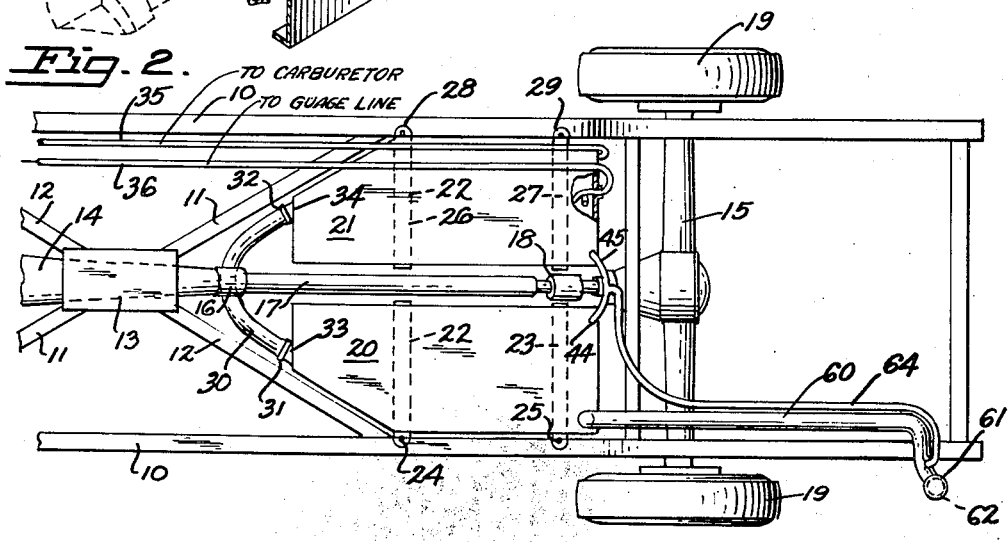
INVENTOR.
Brooks Walker United States Patent Office 2,808,892
Patented Oct. 8, 1957

2,808,892
VEHICLE FUEL TANKS
Brooks Walker, Piedmont, Calif.
Application December 2, 1952, Serial No. 323,551
14 Claims. (Cl. 180—1)

This invention pertains to improvements in vehicle fuel tanks. More particularly, it pertains to improvements in the location and filling means of vehicle fuel tanks, and to improvements in plural fuel tanks.

Previously, motor vehicle fuel tanks have generally been located at the rear of the car, under the vehicle luggage compartment or within the streamlined contours of the vehicle fenders, as shown in my U. S. Patent No. 2,131,306. Attempts to locate the fuel tanks at the front of the car proved unsuccessful and disadvantageous because that concentrated too much weight at the front, and certain recent improvements have now made the conventional location inconvenient and undesirable. For example, some cars employ a fifth wheel—the spare tire mounted vertically in the luggage compartment and movable down onto the road. This desirable feature helps greatly in such maneuvers as parking the vehicle, but it conflicts with the conventional location of the gas tank and renders it untenable. Also, the conventional location reduces the amount of space available for the luggage compartment. Further, the conventional location subjects the tank to possible damage. The present invention has solved this location problem by placing the fuel tank forward of the rear axle on both sides of the drive shaft, where it does not conflict with the luggage compartment and where the frame members protect the tank from injury.

Several additional problems solved by this invention are concerned with the use of two or more fuel tanks. Some automobile manufacturers have found it desirable to provide two fuel tanks, but in many cases the additional fuel tank has brought annoyances. The two tanks had to be filled separately, through separate filler spouts; there were separate floats and a switch for connecting either one, one at a time, to the quantity gauge; and there were separate fuel feed lines with a switch to put either one, one at a time, into service. There was extra expense, because of the extra parts, and there was extra trouble. Sometimes only one tank was filled and the other one was forgotten.

I have solved these problems by joining the two or more tanks together in a novel manner, so that they operate as a single tank. At the same time I provide extra storage space for fuel and make use of space that was formerly wasted. Preferably the tanks are located as stated above—e. g., for two tanks, one is located on each side of the drive shaft, secured to the vehicle frame forward of the rear axle. A large-capacity tube connects the two or more tanks. Each tank has a breather tube which may join with the other tank's breather tube. Only one filler tube need be provided, for it will fill both tanks; only one fuel feed line need be provided, for it will drain both tanks; and only one gauge is needed, for it will measure both tanks simultaneously. Explosive switches are eliminated and greater convenience is obtained.

Other objects and features of this invention will appear from the following description of some preferred embodiments thereof. The description is illustrative only and is not intended to limit the invention narrowly to details of structure.

In the drawings:

Fig. 1 is a view in perspective of a portion of an automobile with the body and some other parts removed or cut away in order to show one embodiment of the principles of my invention and its relation to the vehicle frame.

Fig. 2 is a top plan view of a vehicle portion, similar to the portion shown in Fig. 1, illustrating a somewhat modified form of the invention.

In all figures like numerals of reference refer to corresponding parts.

Figs. 1 and 2 show a vehicle frame 10 with cross members or X-sections 11 and 12 joined by a reinforcing plate 13 where they intersect. The rear portion of the vehicle transmission 14 extends through the intersection of the cross members 11 and 12 and connects the engine (not shown) with the rear axle 15 by means of a forward universal joint 16, a drive shaft 17, and a rear universal joint 18. Rear wheels 19 are attached to the rear axle 15 in the conventional manner.

Instead of having a fuel tank located over the frame 10 rearwardly of the rear axle 15, I prefer to provide a pair of fuel tanks 20 and 21, both located forwardly of the rear axle 15, one on each side of the drive shaft 17. Here, the frame 10 protects the tanks 20 and 21 from injury. The fuel tank 20 may be secured to the frame 10 by a pair of straps 22, 23 which extend underneath the tank 20 and are secured at their outboard ends to the frame 10 by bolts 24, 25. At their inboard ends the straps 22, 23 may be supported by hook bolts 24a, 25a that engage the vehicle body floor (not shown). Similarly the fuel tank 21 is supported by straps 26 and 27 that are secured at their outboard ends to the frame 10 by bolts 28, 29 and at their inboard ends by hook bolts 28a and 29a.

The tanks 20 and 21 are interconnected by means of a hose 30, which passes beneath the drive shaft 17 and may be attached by hose clamps 31 and 32 to tubes 33 and 34, which extend forward from near the bottom of their respective tanks 20 and 21. The low elevation of the hose 30 and of the tubes 33 and 34 assures interconnection of the two tanks 20 and 21 even if there is little fuel, but I prefer to have the fuel feed line 35 lead to the carburetor (not shown) or other engine fuel feed system (not shown) from near the bottom of that fuel tank 21 which is usually the lower, due to the fact that it is farther from the crown of the road. The fuel gauge line 36 may also run from either tank, but I prefer to connect it with the tank 21 from which the feed line 35 leads. The fuel gauge is not shown; it may be of the float type with an electric rheostat or liquid pressure column, or any other system may be used; the point is that only one gauge is necessary in practicing my invention, because the tanks are interconnected by the hose 30.

Two forms of filler tubes are shown. Fig. 1 shows a filler tube 40 with a spout 41 normally covered by a cap 42 and located immediately adjacent to the passenger door housing or frame. The tube 40 leads into the tank 21, but it could lead to the tank 20 instead. Breather tubes 44, 45 lead from tanks 20, 21 respectively into a single breather tube 46 which is connected to the fuel filler neck 47 adjacent the cap 42.

In the embodiment shown in Fig. 2 a fuel filler tube 60 extends back of the rear wheels, and a filler spout 61 is provided with its cap 62, in a structure similar to the filler neck presently in use on well-known cars. Breather tubes 44 and 45 are as in Fig. 1, with a third tube 64 joining them and extending back and connecting with the tube 60 adjacent the cap 62.

Both tanks 20 and 21 are filled through either the fuel filler line 40 or 60. The tanks breathe through the tubes 44 and 45 which are connected to a unitary tube 46 or 64 which connects with the fuel filler line 40 or 60. The interconnection of the tanks 20 and 21 is assured by the hose 30, and one gauge line 36 and one fuel feed line 35 are sufficient.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim as my invention:

1. An automobile including in combination: a body supported on front and rear wheels; a frame between said body and said wheels; a motor for said vehicle located in the forward half of said vehicle; a drive shaft connecting said motor to the rear wheels; a pair of fuel tanks located forward of said rear wheels and secured inside said frame; one said fuel tank being located on each side of said drive shaft; a large capacity fluid conduit passing beneath said drive shaft and connecting together the lower portion of said fuel tanks; and a filling tube leading to one said fuel tank only, the level of fuel in both tanks being balanced by said conduit.

2. An automobile including in combination: a body supported on front and rear wheels; a frame between said body and said wheels; a pair of cross frame members running diagonally across said frame and intersecting each other; a motor for said vehicle located in the forward half of said vehicle; a drive shaft connecting said motor to the rear wheels; a pair of fuel tanks secured to said frame forward of said rear wheels and rearward of the intersection of said cross frame members, one tank being located on each side of said drive shaft; a large capacity fluid conduit passing beneath said drive shaft and connecting the lower forward portions of said fuel tanks; a single filler tube leading into one said tank, said conduit sufficing to conduct fuel from that tank to the other tank and keep them at substantially the same fuel level; a single fuel quantity measuring instrument located in only one of said fuel tanks; and one fuel feeding line connecting one said fuel tank only with the engine, whereby both said fuel tanks may be substantially drained through said fuel feeding line.

3. An automobile, including in combination a frame having generally parallel side members and cross members that intersect each other; front and rear wheels and axles supporting said frame; a drive shaft extending generally parallel to said side members half way between them and operatively connected to said rear axle; a pair of fuel tanks, one on each side of said drive shaft forward of said rear axle and rear of said intersection of said cross members; straps supporting said tanks and bolted to said frame; and a hose passing beneath said drive shaft and connecting the lower portions of said two tanks for fluid movement therethrough between said tanks.

4. The automobile of claim 3 in which there is a single filling tube connected to one tank only.

5. The automobile of claim 3 in which there is a single fuel feed line leading from one said tank only.

6. The automobile of claim 3 in which there is a carburetor connected to one only of said tanks and gauge means leading from said one tank.

7. An automobile, including in combination a frame having generally parallel side members and cross members that intersect each other; front and rear wheels and axles supporting said frame; a drive shaft extending generally parallel to said side members half way between them and operatively connected to said rear axle; a pair of fuel tanks, one on each side of said drive shaft forward of said rear axle and rear of said intersection of said cross members; straps supporting said tanks and bolted to said frame; a hose connecting the lower portions of said two tanks for fluid movement therethrough between said tanks; a separate breather tube for each fuel tank; a unitary breather tube to which said separate breather tubes are joined; and a single fuel filler tube leading to one said tank only, said breather tube being connected into said fuel filler tube.

8. An automobile, including in combination a frame having side members and at least one cross member between them; front and rear wheels and resilient means for supporting said frame; a differential for driving said rear wheels; a drive shaft extending between said side members and operatively connected to said differential; a pair of fuel tanks secured to said frame on opposite sides of said drive shaft forward of the center of said rear wheels and rear of the cross member; a filling conduit leading into one only of said fuel tanks; and a hose of substantial size passing beneath said drive shaft and connecting the lower portions of said fuel tanks for free fluid movement therebetween during the filling operation at all times so that both tanks are filled simultaneously through said filling conduit.

9. The automobile of claim 8, wherein said hose extends across the forward ends of said tanks so that it passes below the forward end of said drive shaft during all normal vertical movement of said drive shaft.

10. The automobile of claim 8, wherein a single fuel feed line substantially smaller than said hose leads from one tank only.

11. The automobile of claim 10, wherein said fuel feed line leads to a carburetor.

12. The automobile of claim 8, wherein breather means for each tank is connected into said single filling conduit.

13. An automobile including in combination: a body supported on front and rear wheels; a frame between said body and said wheels; a motor for said vehicle located in the forward half of said vehicle; a drive shaft connecting said motor to the rear wheels and having a forward and a rear universal joint; a pair of fuel tanks located forward of the center of said rear wheels and secured inside said frame, each one of said fuel tanks being located on each side of said drive shaft; a large capacity fluid conduit passing beneath said drive shaft and connecting together the lower portion of said fuel tanks, adjacent said forward universal joint, where vertical movement of said shaft approaches its minimum.

14. An automobile, including in combination a frame having side members and cross members that are connected to said side members; front and rear wheels supporting said frame; a rear differential for driving said rear wheels; a drive shaft extending between said side members of said frame and operatively connected to said differential; a pair of fuel tanks, one on each side of said drive shaft forward of said differential and rear of said cross members; supports for said tanks; a single fuel filler tube leading to one said tank only; a hose connecting the lower portions of said two tanks for fluid movement approximately equal to fluid flow through said filler tube between said tanks; a separate breather tube for each fuel tank; a unitary breather tube to which said separate breather tubes are joined; said breather tube being connected into said fuel filler tube.

References Cited in the file of this patent

UNITED STATES PATENTS

| 930,334 | Augustus | Aug. 10, 1909 |
| 1,303,290 | Gibbs | May 13, 1919 |
| 1,757,429 | Jantsch | May 6, 1930 |
| 1,760,457 | Walker | May 27, 1930 |
| 1,861,001 | Fageol | May 31, 1932 |
| 2,035,895 | Kelly | Mar. 31, 1936 |
| 2,053,546 | Anibal | Sept. 8, 1936 |
| 2,054,145 | Tandy | Sept. 15, 1936 |
| 2,080,748 | Slack | May 18, 1937 |
| 2,131,306 | Walker | Sept. 27, 1938 |

(Other references on following page)

UNITED STATES PATENTS

| | | |
|---|---|---|
| 2,276,963 | Griffin | Mar. 17, 1942 |
| 2,465,173 | Scales et al. | Mar. 22, 1949 |
| 2,486,790 | Lane | Nov. 1, 1949 |
| 2,490,213 | Dickson | Dec. 6, 1949 |
| 2,508,218 | Brewer | May 16, 1950 |
| 2,529,361 | Abbas | Nov. 7, 1950 |

FOREIGN PATENTS

| | | |
|---|---|---|
| 109,669 | Great Britain | Sept. 27, 1917 |

OTHER REFERENCES

Automotive Industries, Feb. 15, 1950, vol. 102, No. 4, page 33.